United States Patent Office 3,510,454
Patented May 5, 1970

---

3,510,454
PROCESS FOR THE PRODUCTION OF POLYBENZOXAZINE DIONES
Ludwig Bottenbruch, Krefeld-Bockum, and Hermann Schnell, Krefeld-Uerdingen, Germany, assignors to Farbenfabriken Bayer Aktiengesellschaft, Leverkusen, Germany
No Drawing. Continuation-in-part of application Ser. No. 573,182, Aug. 18, 1966. This application Jan. 29, 1969, Ser. No. 795,049
Claims priority, application Germany, Jan. 3, 1966, F 48,080
Int. Cl. C08g 22/08
U.S. Cl. 260—47                                    7 Claims

---

ABSTRACT OF THE DISCLOSURE

Process for the production of high molecular weight film-forming and fiber-forming poly-1,3-benzoxazine-2,4-diones by reacting a di-o-hydroxyaryl dicarboxylic acid aryl ester with an organic diisocyanate under anhydrous conditions in the presence of an organic solvent and a catalyst at temperatures between 20 and 200° C. and directly recovering the poly-1,3-benzoxazine-2,4-diones.

---

This application is a continuation-in-part of copending application S.N. 573,182, filed Aug. 18, 1966 now abandoned.

This invention relates to a one step process for preparing poly-1,3-benzoxazine-2,4-diones from di-o-hydroxyaryl dicarboxylic acid aryl esters and organic diisocyanates.

Poly-1,3-benzoxazine-2,4-diones have been described in U.S. Pat. 3,244,675. According to this patent however, they can be utilized only by means of a two step process of first reacting a diisocyanate with a dialkyl ester of a dihydroxy dicarboxylic acid to a shapeable polyurethane intermediate, and then heating the shaped polyurethane article to a temperature of at least 200° C. to form the poly-1,3-benzoxazine-2,4-dione.

It is an object of this invention to provide a one step process by which high molecular weight film-forming and fiber-forming polybenzoxazine diones are obtained in a direct reaction by reacting di-o-hydroxyaryl dicarboxylic acid aryl esters with organic diisocyanates. The di-o-hydroxyaryl dicarboxylic acids have the formula

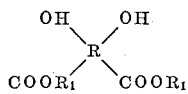

wherein $R_1$ represents an aryl group and R an arylene group consisting of phenylene, naphthalene, anthracene, diphenylene or a bivalent radical of the formula

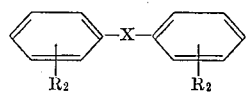

wherein X is alkylene having 1 to 4 carbon atoms or cyclohexylene and $R_2$ a lower alkyl group. The organic diisocyanates have the general formula OCN–R′–NCO, wherein R′ represents phenylene, an alkylphenylene, naphthalene, diphenylene or a bivalent radical of the formula

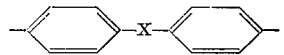

wherein Y is an alkylene group having 1 to 4 carbon atoms, the cyclohexylene group, carbonyl group, oxygen or sulphur.

The reaction corresponds for example to the following equation:

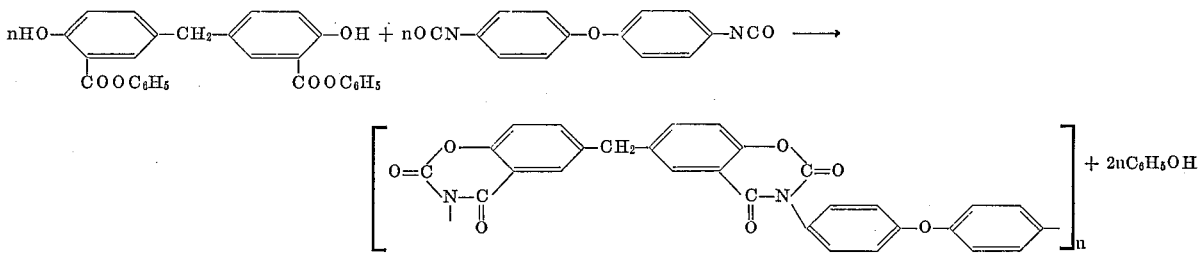

The aryl esters of the following dihydroxyaryl dicarboxylic acids can, for example, be used for this process: 3,6-dihydroxy-phthalic acid, resorcinol-2,4-dicarboxylic acid, resorcinol-4,6-dicarboxylic acid, 2,5-dihydroxy terephthalic acid, 4,4 - dihydroxydiphenyl-3,3′-dicarboxylic acid, 4,4′-dihydroxy-5,5′-dimethyl-diphenylmethane-3,3′-dicarboxylic acid and 1,1-(4,4′-dihydroxy-5,5′-dimethyldiphenyl)-ethane-3,3′-dicarboxylic acid.

Organic diisocyanates which can be used for the reaction are, for example: hexamethylene-1,6-diisocyanate, prfeferably aromatic diisocyanates such as toluylene-2,4-diisocyanate, diphenylmethane-4,4′-diisocyanate, diphenyl-2,2 - propane - 4,4′- disocyanate, diphenylether-4,4′-diisocyanate, diphenylether-4,4′-diisocyanate, naphthalene-1,5-diisocyanate, diphenylsulphide-4,4′-diisocyanate, diphenylsulphone-4,4′-diisocyanate.

The reaction components should as far as possible be used in stoichiometric quantities, but it may be expedient in many cases to use the diisocyanates or dihydroxy-dicarboxylic acid esters with an excess of 0.1 mol percent to 1 mol percent.

The reaction is preferably carried out in a neutral polar organic solvent. Dimethyl formamide, dimethyl acetamide, tetramethylene sulphone and dimethyl sulphoxide are for example suitable for this purpose, optionally in combination with other neutral solvents, such as aromatic hydrocarbons, e.g. benzene and toluene, aliphatic chlorinated hydrocarbons, e.g. methylene, chloride, chloroform and tetrachlorethane, aromatic chlorinated hydrocarbons, e.g. chlorobenzene, aliphatic ethers, e.g. diethylether and diisopropylether, or cyclic ethers, e.g. dioxane and tetrahydrofuran. Dimethyl sulphoxide is especially suitable as a solvent since the reaction proceeds smoothly and quickly in this solvent. The obtained polymers represent generally a quantitative yield of polybenzoxazine diones.

The reaction takes place at a temperature between +20° C. and 200° C., but adavntageously between approximately 80° C. and 120° C.

The reaction can be catalyzed by tertiary amines. Triethyl amine, tributyl amine, pyridine, toluidine, quinoline, N-methyl morpholine, N-ethyl morpholine and triethylene diamine are, for example, effective for this purpose. The catalysts are added in quantities of 0.01% to 1%, but preferably in quantities of 0.01% to 0.1%, calculated on the reactants.

The reactants and the solvents must be used with a high degree of purity and in particular they must as far as possible be quantitatively freed from water, since otherwise no products of high molecular weight are obtained. A useful test of freedom from water consists in treating the solvent with an isocyanate at room temperature in vacuo. If evolution of gas occurs, the solvent is not suffiently anhydrous for the reaction.

In order to avoid discolorations, the reaction may be effected in inert gases, e.g. nitrogen.

By the addition of aryl esters of o-monohydroxyaryl-monocarboxylic acids, such as phenyl salicylate and phenyl-o-cresotinate, it is possible to regulate the molecular weight of the polybenzoxazine diones.

In many cases, the polybenzoxazine dione is soluble in the reaction mixture. The progress of the reaction can in these cases be followed directly from the increase in the viscosity of the solution. Another useful way of following the conversion is the investigation by infra-red spectroscopy. The polybenzoxazine diones are characterized by characteristic bands in the infra-red region.

The reaction mixture can be worked up by various methods: in many cases, it is expedient to process the reaction mixture directly to form shaped elements, such as foils or filaments. The reaction mixture can for example be processed by the dry casting method to form foils or by the dry spinning method to form filaments. If it is desired to isolate the polybenzoxazine diones, a precipitant is added to the reaction solution. With water-miscible solvents, water can be used as a precipitant. The precipitation with methylene chloride has proved suitable, since in this case products in fine powder form are obtained and these can be satisfactorily washed and dried. In many cases, the polybenzoxazine dione precipitates during the reaction as a crystalline powder and can be recovered simply by being filtered off.

One useful way of carrying out the process as described is as follows: the diisocyanate is dissolved in dimethyl sulphoxide, the di-o-hydroxyaryl dicarboxylic acid aryl ester and a catalytic quantity of the tertiary amine are added and heating takes place with stirring to about 100° C. Methylene chloride is added to the suspension of solution or the polymer while stirring, and the product in powder form is filtered off and dried in vacuo at about 100° C.

The polybenoxazine diones obtained according to the process of this invention are polymers of high melting point or even polymers which cannot be melted, and they are distinguished by an excellent resistance to aging in air at high temperatures. They are insoluble in most solvents and are not swellable, while they are resistant to acid and basic agents. They can be processed via the solution to form transparent shaped elements, such as foils or filaments. They show very good mechanical and electrical properties. Shaped elements can be orientated and crystallized by drawing and in this form they have improved mechanical properties. In the form of powders, they can be sintered at high temperatures to form shaped elements.

The following examples illustrate more specifically the invention.

EXAMPLE 1

18.25 parts by weight of diphenyl ether-4,4'-diisocyanate are dissolved in 431 parts by weight of anhydrous dimethyl sulphoxide. 25.35 parts by weight of resorcinol-4,6-dicarboxylic acid diphenyl ester and 0.02 part by weight of triethylene diamine are added to the solution, which is heated with stirring to 105° C. Within 3 hours, the reaction mixture reaches a maximum viscosity. This is diluted with the same volume of dimethyl sulphoxide and, while stirring, the same quantity by weight of ethylene chloride is added, the reaction product precipitating as a fine powder. This is filtered with suction, is thereafter stirred twice with about 100 parts by volume of methanol and is dried in vacuo at 100° C. (quantitative yield).

The polybenzoxazine dione which is obtained has a relative viscosity of 2.9, measured at 25° C. in dimethyl formamide (1 g. of polymer in 100 parts by volume of solution). It is soluble, for example, in dimethyl formamide, dimethyl sulphoxide, tetramethylene sulphone and dimethyl acetamide, but it is insoluble, for example, in aliphatic and aromatic hydrocarbons, chlorinated hydrocarbons, ethyl acetate, dioxane, tetrahydrofuran and cresol. Foils obtained from a solution is dimethyl formamide are colorless and transparent. They have a tensile strength of 1000 kg./cm.$^2$ with an elongation of 70%. A foil stored in air at 220° C. shows a slight brown coloring after 500 hours. The relative viscosity falls within 2 days from 2.9 to 2.6, but then remains constant.

EXAMPLE 2

16.98 parts by weight of diphenylether - 4,4'-diisocyanate are dissolved in 422 parts by weight of anhydrous dimethyl sulphoxide. 23.58 parts by weight of hydroquinone-2,5-dicarboxylic acid diphenyl ester and 0.02 part by weight of triethylene diamine are added and heating takes place with stirring to 95° C. After a short time, the reaction product starts to crystallize out. The temperature is kept for 5 hours at 95° C. with stirring, the reaction mixture is then cooled and the same volume of methanol is added thereto. The reaction product is filtered off, washed twice with methanol and dried in vacuo at 100° C.

The reaction product is insoluble in the solvents mentioned in Example 1. It is soluble, for example, in concentrated sulphuric acid and has a relative viscosity of 2.10, measured at 25° C. in concentrated sulphuric acid (1 g. of polymer in 100 parts by volume of solution).

EXAMPLE 3

60.56 parts by weight of diphenylether-4,4'-diisocyanate are dissolved in 1684 parts by weight of dimethyl sulphoxide. 102.39 parts by weight of 4,4'-dihydroxydiphenyl-3,3'-dicarboxylic acid diphenyl ester and 0.08 part by weight of triethylene diamine are added and heating takes place with stirring to 105° C.

After 60 minutes, the viscosity of the homogeneous reaction mixture has risen to the maximum value. The mixture is cooled to room temperature, the same volume of dimethyl sulphoxide is added and 3000 parts by volume of methylene chloride are introduced with stirring. The perecipitated, pulverous reaction product is filtered off, stirred twice with 500 parts by volume of methanol and dried in vacuo at 100° C.

The reaction product has a relative viscosity of 2.50, measured in cresol at 25° C. (1 part by weight of polymer in 100 parts by volume of solution). The product is soluble, for example, in cresol, concentrated sulphuric acid and dimethyl acetamide, sparingly soluble in dimethyl formamide and dimethyl sulphoxide, insoluble in, for example, aliphatic and aromatic hydrocarbons and chlorinated hydrocarbons, ethyl acetate, dioxane and tetrahydrofuran. Films cast from a solution in cresol are colorless and transparent. A foil kept in air at 220° C. shows no fall in relative viscosity over a period of 500 hours. Molecular weight: 36,900.

EXAMPLE 4

12.80 parts by weight of diphenylether-4,4'-diisocyanate are dissolved in 368 parts by weight of anhydrous dimethyl sulphoxide. 22.35 parts by weight of 4,4'-dihydroxy-diphenyl-methane-3,3'-dicarboxylic acid diphenyl ester and 0.02 part by weight of triethylene diamine are added to the solution, which is heated with stirring to 100° C. Within 1 hour, the reaction solution reaches its maximum viscosity. The solution is cooled to room temperature and the same volume of methylene chloride is added. The precipitated pulverous reaction product is filtered off, stirred twice with methanol and dried in vacuo at 100° C. The polymer has a relative viscosity of 2.10, measured in cresol at 25° C. (1 part by weight of polymer in 100 parts by volume of solution). It is possible to cast transparent and colorless foils from this solution. Molecular weight: 25,400.

EXAMPLE 5

12.66 parts by weight of diphenylether-4,4'-diisocyanate dissolved in 359 parts by weight of anhydrous dimethyl sulphoxide. 23.52 parts by weight of 4,4'-dihydroxy-3,3'-dimethyl diphenyl methane-5,5'-dicarboxylic acid diphenyl ester and 0.02 part by weight of triethylene diamine are added and the solution is heated with stirring to 100° C. Within 4 hours, the reaction mixture reaches its maximum viscosity. A part of the reaction product crystallizes out in this time. The product is cooled to room temperature and the same volume of methylene chloride is added with stirring. The precipitated, pulverous polymer is filtered off, stirred twice with methanol and dried in vacuo at 100° C. The polymer has a relative viscosity of 1.76, measured in cresol at 25° C. (1 part by weight of polymer in 100 parts by volume of solution). It is also soluble in cresol and can be cast from this solution as transparent, colorless foils. It is soluble in concentrated sulphuric acid and insoluble in dimethyl formamide. Molecular weight: 22,100.

EXAMPLE 6

9.42 parts by weight of tolylene-2,4-diisocyanate are dissolved in 290 parts by weight of anhydrous dimethyl sulphoxide. 18.95 parts by weight of resorcinol-2,4-dicarboxylic acid diphenyl ester and 0.02 part by weight of triethylene diamine are added and the solution is heated with stirring to 100° C. Within 1 hour, the reaction solution reaches its maximum viscosity. The same volume of methylene chloride is added, and the precipitated polymer is filtered off. This is stirred twice with methanol and dried in vacuo at 100° C. The polymer has a relative viscosity of 1.43 in dimethyl formamide at 25° C. (1 part by weight of polymer in 100 parts by volume of solution). It is soluble in dimethyl sulphoxide. Foils cast from a solution in dimethyl formamide are colorless and transparent.

EXAMPLE 7

9.00 parts by weight of tolylene-2,4-diisocyanate are dissolved in 313.6 parts by weight of dry dimethyl sulphoxide. 22.04 parts by weight of 4,4'-dihydroxydiphenyl-3,3'-dicarboxylic acid diphenyl ester and 0.02 part by weight of triethylene diamine are added and heating takes place with stirring to 100° C. Within 1 hour, the homogeneous reaction mixture reaches its fiinal viscosity. After cooling to room temperature, the same volume of methylene chloride is added thereto and the precipitated polymer is filtered off. This is stirred twice with methanol and dried at 100° C. in vacuo. The polymer has a relative viscosity of 1.52, measured in dimethyl formamide at 25° C. (1 part by weight of polymer in 100 parts by volume of solution). Foils produced from a solution is dimethyl formamide are colorless and transparent. Molecular weight: 56,000.

EXAMPLE 8

20.13 parts by weight of naphthylene-1,5-diisocyanate are dissolved in 299 parts by weight of anhydrous dimethylsulfoxide at a temperature of 90° C. 40.84 parts by weight of 4,4'-dihydroxy diphenyl-3,3'-dicarboxylic acid phenyl ester and 0.88 parts by weight of triethylene diamine are added. Within 30 seconds the reaction mixture reaches a maximum viscosity, whilst the temperature rises to 100° C. The reaction mixture is diluted with 300 parts by weight of dimethylsulfoxide and, while stirring, 300 parts by weight of methylene chloride are added. The precipitated polybenzoxazine dione is filtered with suction, washed with methylene chloride and dried in vacuo at 120° C. (quantitative yield). Rel. solution viscosity 4.43—measured at 25° C. in a 1 percent by weight solution of the polymer in concentrated sulfuric acid. The polymer is soluble in dimethyl formamide and cresol.

EXAMPLE 9

25.22 parts by weight of diphenylether-4,4'-diisocyanate are dissolved in 410 parts by volume of anhydrous dimethylsulfoxide. 40.51 parts by weight of 4,4'-dihydroxydiphenyl-3,3'-dicarboxylic acid phenyl ester and 0.73 parts by weight of adipic acid and 0.08 part by weight of diethylene triamine are added. The mixture is heated under stirring at a temperature of 100° C. The reaction mixture is diluted after 4.5 hours with 100 parts by volume of dimethylsulfoxide and 500 parts by weight of methylene chloride. The polymer is obtained according to the procedure of Example 8. Rel. solution viscosity 1.75—molecular weight: 21,200. Foils (prepared by casting the solution) have a good age resistance at 250° C. in air.

EXAMPLE 10

According to Example 9 a polymer was prepared from 25.22 parts by weight of diphenylether-4,4'-diisocyanate, 36.38 parts by weight of 4,4'-dihydroxydiphenyl-3,3'-dicarboxylic acid phenyl ester, 1.46 parts by weight of adipic acid and 0.08 part by weight of diethylene diamine. After 7 hours the reaction mixture is diluted with 500 parts by volume of methylene chloride. The polymer is soluble in m-cresol (rel. solution viscosity 1.60—molecular weight 23,100).

EXAMPLE 11

151.35 parts by weight of diphenylether-4,4'-diisocyanate (0.80 mol) and 31.50 parts by weight of naphthylene-1,5-diisocyanate (0.20 mol) are dissolved in 2,325 parts by volume of anhydrous dimethylsulfoxide at a temperature of 85° C. 319.80 parts by weight of 4,4'-dihydroxydiphenyl-3,3'-dicarboxylic acid phenyl ester and 0.63 part by weight of diethylene triamine are added and heated at 100° C. under stirring. After 30 minutes the reaction mixture is diluted with 3,000 parts by volume of dimethylsulfoxide and 2,000 parts by volume of methylene chloride. According to the procedure of Example 9 a polymer was obtained (quantitative yield) having a rel. solution viscosity of 2.15 and a molecular weight of 50,000. The polymer may be cast to foils or spun to filaments from solution.

What is claimed is:
1. Process for the production of high molecular weight film-forming and fiber-forming poly-1,3-benzoxazine-2,4-diones, consisting essentially of reacting a di-o-hydroxyaryl dicarboxylic acid aryl ester with an organic diisocyanate, said reaction being effected under anhydrous conditions in the presence of an organic solvent and a tertiary amine catalyst at temperatures of between 20 and

200° C. and directly recovering said poly-1,3-benzoxazine-2,4-diones.

2. The process according to claim 1, wherein the reaction is carried out with dimethylsulfoxide as a solvent.

3. The process according to claim 1, wherein tertiary amines are used as catalysts.

4. The process according to claim 1, wherein the reaction is conducted in an inert gas atmosphere.

5. Process for the production of high molecular weight film-forming and fiber-forming poly-1,3-benzoxazine-2,4-diones consisting essentially of reacting the diaryl ester of a di-o-hydroxyaryl dicarboxylic acid selected from the group consisting of di-o-hydroxy phenylene dicarboxylic acids, di-o-hydroxy diphenylene dicarboxylic acids and di-o-hydroxy dicarboxylic acids having the formula:

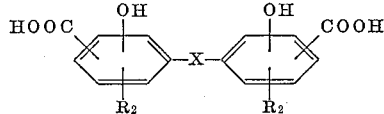

wherein X is alkylene of 1 to 4 carbon atoms or cycloalkylene and $R_2$ is hydrogen or a lower alkyl group with an organic diisocyanate, said reaction being effected under anhydrous conditions in an organic solvent at a temperature of 20 to 200° C. in the presence of catalytic concentrations of a tertiary amine and directly recovering said poly-1,3-benzoxazine-2,4-diones.

6. The process according to claim 5, wherein the organic diisocyanate has the formula OCN—R'—NCO wherein R' is phenylene, alkyl phenylene, diphenylene or a bivalent radical of the formula:

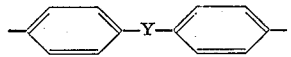

in which Y is an alkylene group of 1 to 4 carbon atoms, cyclohexylene, carbonyl, oxygen or sulfur.

7. The process according to claim 5, wherein the phenyl ester of the dicarboxylic acid is employed, the dicarboxylic acid is hydroquinone-2,5-dicarboxylic acid, 4,4'-dihydroxydiphenyl-3,3'-dicarboxylic acid, 4,4'-dihydroxy-3,3'-dimethyl-diphenylmethane-5,5'-dicarboxylic acid or resorcinol-2,4-dicarboxylic acid, and the organic diisocyanate is diphenylether-4,4'-diisocyanate, toluylene-2,4-diisocyanate or naphthylene-1,5-diisocyanate.

References Cited

UNITED STATES PATENTS 3,244,675   4/1966   Angelo _____ 260—77.5

WILLIAM H. SHORT, Primary Examiner

L. L. LEE, Assistant Examiner

U.S. Cl. X.R.

260—63, 77.5, 78.4

UNITED STATES PATENT OFFICE
CERTIFICATE OF CORRECTION

Patent No. 3,510,454                                              May 5, 1970

Ludwig Bottenbruch et al.

It is certified that error appears in the above identified patent and that said Letters Patent are hereby corrected as shown below:

Column 2, line 49, "prfeferably" should read -- preferably --. Column 3, line 12, "adavntageously" should read -- advantageously --. Column 2, formula (line 18) "X" should read -- Y --. Column 5, line 28, "nate dissolved" should read -- nate are dissolved --.

Signed and sealed this 29th day of September 1970.

(SEAL)
Attest:

Edward M. Fletcher, Jr.                        WILLIAM E. SCHUYLER, JR.
Attesting Officer                                       Commissioner of Patents